(12) United States Patent
Schramm et al.

(10) Patent No.: US 8,598,457 B2
(45) Date of Patent: Dec. 3, 2013

(54) FLEXIBLE ELECTRICAL LINE

(75) Inventors: Judith Schramm, Baesweiler (DE);
Walter Winkelbauer, Duisburg (DE);
Christian Cornelissen, Rodgau (DE);
Smaeil Basiry, Erkelenz (DE);
Heinz-Willi Hamacher,
Moenchengladbach (DE)

(73) Assignee: Nexans, Paris (FR)

(*) Notice: Subject to any disclaimer, the term of this patent is extended or adjusted under 35 U.S.C. 154(b) by 160 days.

(21) Appl. No.: 13/334,905

(22) Filed: Dec. 22, 2011

(65) Prior Publication Data
US 2012/0222898 A1    Sep. 6, 2012

(30) Foreign Application Priority Data
Mar. 3, 2011   (EP) .................................. 11305227

(51) Int. Cl.
*H01B 7/04*  (2006.01)
*H01B 7/00*  (2006.01)

(52) U.S. Cl.
USPC .................. 174/70 C; 174/113 C; 174/128.1; 174/128.2

(58) Field of Classification Search
USPC ........... 174/70 R, 68.1, 77 R, 79, 88 R, 10 R, 174/113 R, 116, 113 C, 128.1, 131 A, 128.2, 174/105 R
See application file for complete search history.

(56) References Cited

U.S. PATENT DOCUMENTS

| | | | | |
|---|---|---|---|---|
| 4,677,256 A | * | 6/1987 | Bauer et al. ................... | 174/116 |
| 6,576,844 B1 | * | 6/2003 | Kamata ....................... | 174/126.2 |
| 7,145,082 B2 | * | 12/2006 | Hochleithner et al. ..... | 174/128.1 |
| 7,180,002 B2 | * | 2/2007 | Bertges et al. ............. | 174/128.1 |
| 7,495,176 B2 | * | 2/2009 | Winkelbauer et al. .... | 174/113 C |
| 7,750,245 B2 | * | 7/2010 | Debladis et al. .......... | 174/113 C |
| 7,847,192 B2 | * | 12/2010 | Grogl et al. ................ | 174/128.1 |

* cited by examiner

*Primary Examiner* — Angel R Estrada
(74) *Attorney, Agent, or Firm* — Sofer & Haroun, LLP

(57) ABSTRACT

A flexible electrical line has at least one sensor element with two leads in a core, the leads made from insulated electrical conductors which are surrounded by a common outer casing of insulation material. The core is three phase leads of a conductor and insulation which are stranded together for energy transmission. The conductors of the leads are copper wires which surround a tension-proof central element in two layers with oppositely directed threading direction. The insulation of the leads is a cross-linked elastomer material applied by extrusion with a dielectricity number of at least 6.0 at room temperature. The unit, composed of leads and filler strands of the sensor element, is surrounded by a casing of an electrically conductive polymer material, and the core of the line is surrounded by a common inner casing produced by extrusion over which is arranged the outer casing.

7 Claims, 1 Drawing Sheet

FLEXIBLE ELECTRICAL LINE

RELATED APPLICATION

This application claims the benefit of priority to European Patent Application No. 11 305 227.8, filed on Mar. 3, 2011, the entirety of which is incorporated by reference.

BACKGROUND

1. Field of the Invention

The invention relates to a flexible electrical line which in a core has at least one sensor element and leads consisting of insulated electrical conductors which are surrounded by a common outer casing of insulation material, in which the sensor element consists of respectively two leads each having an insulated electrical conductor with a tension-proof central element which, together with two filler strands consisting of insulation material are stranded into a unit which is surrounded by a banding of insulation material, over which a casing is arranged (DE 10 2006 015 878 A1).

2. Description of Related Art

Lines of this type can be used, for example, in large crane systems which move around in a harbor area, for example, along a rail system. The line is wound onto a coil which is rotatably mounted, for example, on a crane. It is coiled on and off when loads or the entire crane are moved. During this procedure, tension loads may act on the line, particularly when a change of the direction of rotation of the coil occurs, and during start-up and/or deceleration. The tensile loads may also be detected and may be indicated by a sensor element contained in the line and displayed.

The known flexible line according to the above-mentioned DE 10 2006 015 878 A1 has a centrally arranged sensor element whose capacity values change in dependence on the tensile load of the line. These changes can be measured and used for influencing the drive of the coil onto which the line is being wound, in order to achieve a reduction of the load acting on the line. In this line, two layers of control leads are stranded onto the sensor element, wherein the control leads are surrounded by an outer casing of insulation material. For example, by means of the control leads, signals can be transmitted to a crane or for the drive of the coil onto which the line is being wound. In the same manner, it is possible to supply through the control leads a voltage of at most 1 kV to a crane installation. The sensor element has a pair of leads composed of two insulated conductors. Each lead thereof consists of a core element of a tension-proof synthetic material, a layer of copper wires stranded onto the core element, and a layer of a compressible insulation material which surrounds the layer of copper wires. The pair of leads is stranded together with two filler strands which consist of polyethylene terephthalate yarns. The sensor element is surrounded by a casing of synthetic material.

OBJECTS AND SUMMARY

The invention is based on the object of further developing the above-described line in such a way that an energy transmission on the middle voltage level with voltages above 1 kV is facilitated, while simultaneously increasing the response sensitivity of the sensor element.

In accordance with the invention, this object is met in that in the core of the line are arranged as electrical leads, three phase leads which are stranded together and serve for the transmission of energy with voltages above 1 kV, wherein the phase that the conductors of the leads of the sensor element consist of copper wires which surround the tension-proof central element in two layers with oppositely directed stranding directions, that the insulation of the leads of the sensor element is composed of a cross-linked elastomer material with a dielectricity number of at least 6.0 at room temperature, wherein the elastomer material is applied by extrusion, that the unit of leads and filler strands which are stranded together are surrounded by a casing of an electrically conductive polymer material, and the core of the line consisting of phase leads and the sensor element is surrounded by a common internal casing produced by extrusion, wherein the outer casing is arranged over the inner casing.

This line has three phase leads which are stranded to each other by means of which an energy transmission of voltages above 1 kV is possible. The voltages used are advantageously in the so-called middle voltage level between 1 kV and 45 kV. By means of these phase leads, it is possible to supply a plant connected to the line, for example, a crane system, with electrical current without any other connections. Because of the selected construction of the conductors of the strand of the leads of the sensor element with two layers of stranded copper wires, the radial dimensions of the leads can be reduced, with the size of the electrically conducted cross-section of the conductors remaining unchanged. Consequently, the total radial dimensions of the sensor element can also be reduced, so that the sensor element can be arranged advantageously, for example, centrally between the phase leads. The copper wires may advantageously be galvanized.

Because of the described construction, the sensor element additionally has improved electrical properties and, thus, increased response sensitivity. On the one hand, the conductive casing of the sensor element reduces electrical interference influences from outside the sensor element. On the other hand, because of the material of the insulation of the leads, which has a high dielectricity number of at least 6.0 at room temperature, the capacity between the two conductors is significantly increased, so that a faster and more precisely measureable change of this capacity occurs as a result of a tensile load, acting on the line. The dielectricity number of the material of the insulation of the leads is advantageously at least 6.5 at room temperature.

BRIEF DESCRIPTION OF THE DRAWINGS

Embodiments of the subject matter of the invention are illustrated in the drawings.

In the drawings.

DETAILED DESCRIPTION

Figures 1, 2:
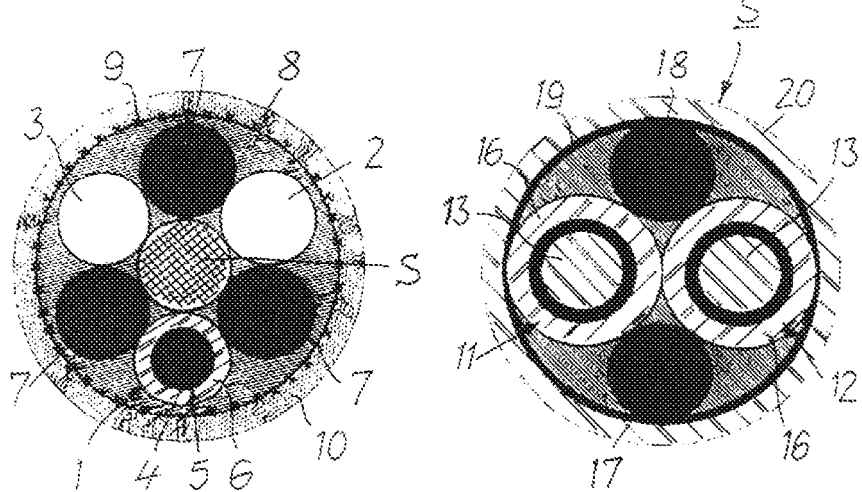
FIG. 1 is a cross-sectional view of a line according to the invention.
FIG. 2 is an illustration of the sensor element present in the line according to FIG. 1, on a larger scale.

Three phase leads are denoted by 1, 2 and 3, by means of which energy can be transmitted, preferably in the middle voltage level with voltages which are above 1 kV. The three phase leads 1, 2 and 3 each have an electrical conductor 4 which is surrounded by an inner conductive layer 5, wherein insulation 6 is placed on the conductive layer 5. For simplicity's sake, this configuration is shown in the drawing only for phase lead 1. It is also applicable to phase leads 2 and 3. Advantageously, the conductors 4 are each constructed as conductor strands with wires consisting of copper, wherein the wires may also be galvanized. Over the conductors 4, additionally a banding of an electrically conductive non-woven fiber material may be arranged onto which the inner conductor layer 5 is applied, for example, by extrusion. For example, the conductive layer consists of a polymer material which has been rendered electrically conductive by the addition of soot.

In all three phase leads 1, 2 and 3, the insulation 6 advantageously consists of a material on the basis of ethylene-propylene-rubber (EPR). The insulation 6 is extruded around the inner conductive layer 5. An outer extruded conductive layer may additionally be arranged, wherein the outer conductive layer is constructed in the same manner as the inner conductive layer 5.

Figure 3:
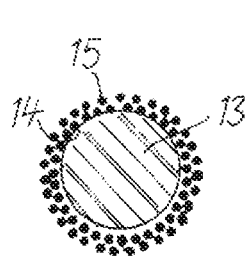
FIG. 3 shows a detail of FIG. 2, on an even larger scale.

In addition to the three phase leads 1, 2 and 3, the line according to FIG. 1 comprises a sensor element S and the three filler elements which are located in the spaces between the phase leads 1, 2 and 3 and, as a result of which, the line according to FIG. 1 has an approximate circular cross-section. The construction of the sensor element S is illustrated in FIGS. 2 and 3. The filler element 7 can basically be constructed as desired. Advantageously, at least one of the filler elements 7 is a protective conductor.

Phase leads 1, 2 and 3, sensor element S and filler elements 7 are stranded together as stranded elements. The stranded elements are surrounded by an inner casing 8 which is produced by extrusion and which has an approximately cylindrical outer surface. The inner casing 8 may be constructed of an inner layer which fills out the spaces between the stranded elements and of electrically conductive rubber mixture, as well as of an electrically nonconductive insulating layer as an outer layer arranged over the inner layer. A fabric 9 serving as torsion protection can be arranged around the inner casing 8, wherein, for example, the fabric 9 consists of polyester threads. Placed over the fabric 9 is an outer casing 10 produced by extrusion and advantageously consisting of a rubber mixture which may consist of a material on the basis of chlorinated rubber.

In the embodiment of the line according to FIG. 1, the sensor element S is located centrally between the phase leads 1, 2 and 3. It consists of two leads 11 and 12 of which each has a central tension-proof element 13 over which the respective electric conductor is arranged. The tension-proof element 13 is constructed, for example, of polyamide threads. The conductors of the leads 11 and 12 each consist of two layers 14 and 15 of copper wires which are mounted with an oppositely directed stranding direction. The inner layer 14 is placed around the tension-proof element 13, while the outer layer 15 is stranded around the inner layer 14 (FIG. 3). Arranged over the conductors of the leads 11 and 12, is an insulation 16 of an electrically high-grade material produced by extrusion. The insulation consists advantageously of a cross-linked, polymer material with a dielectricity number of the insulation 16 of at least 6.0 at room temperature. In accordance with a preferred embodiment, the dielectricity number of the insulation 16 is at least 6.5 at room temperature.

Arranged in the spaces between the leads 11 and 12 are two filler strands 17 and 18 which are stranded together with the leads 11 and 12. They consist, for example, of polyethylene terephthalate threads. The threaded unit of leads 11 and 12 as well as filler strands 17 and 18 is surrounded, for example, by a layer of polyester non-woven fabric over which is arranged a layer of a polyethylene terephthalate foil 19. Over the foil 19 is arranged a casing 20 produced by extrusion and consisting of an electrically conductive polymer material. Instead of the polyester fabric, it is also possible to use a non-woven fabric of copper threads or a copper fabric over which the foil 19 is then placed. The sensor element S then has an improved electrical screening.

Figure 4:
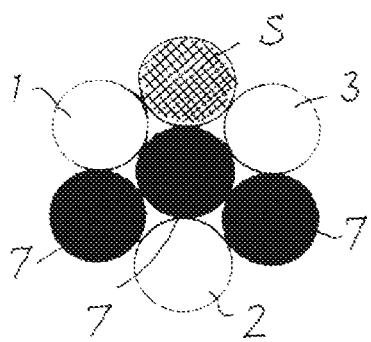
FIG. 4 is a cross-sectional view of a line which deviates from the embodiment according to FIG. 1.

The sensor element S may also have in the configuration of the line a position which deviates from that in FIG. 1. In accordance with FIG. 4, which only shows the stranding elements in a schematic view without the layers surrounding them, the sensor element S can be stranded in a non-central position in a space between the phase leads 1, 2 or 3. In this embodiment of the line, once again three filler elements 7 are present, wherein one of which serves as a core element. The two other filler elements are located in the remaining spaces between the phase leads 1, 2 and 3. The remaining configuration of the line corresponds to the configuration of the line according to FIG. 1.

The invention claimed is:

1. A flexible electrical line, comprising:
   in a core, at least one sensor element; and
   leads composed of insulated electrical conductors which are surrounded by a common outer casing of insulation material,
   wherein the sensor element is composed of always two leads each having an insulated electrical conductor with a tension-proof central element, which are stranded together into a unit with two filler strands composed of insulating material,
   wherein the unit is surrounded by a banding of insulation material over which a casing is arranged,
   wherein, arranged in the core of the line, are arranged as electrical leads, three phase leads, which are stranded together and serve for transmitting energy with voltages above 1 kV, wherein the phase leads each have at least one inner conductive layer surrounding the conductor and an insulation above the conductor layer,
   wherein the conductors of the leads of the sensor element are composed of copper wires which surround the tension-proof central element in two layers with oppositely directed stranding directions,
   wherein the insulation of the leads of the sensor element is composed of a cross-linked elastomer material which is applied by extrusion and has a dielectricity number of at least 6.0 at room temperature,
   wherein the unit of leads and filler strands which are stranded together are surrounded by a coating of an electrically conducted polymer material, and
   wherein, the core of the line composed of phase leads and sensor element is surrounded by a common inner casing produced by extrusion, above which the outer casing is arranged.

2. Line according to claim 1, wherein the copper wires of the conductors of the leads of the sensor element are galvanized.

3. Line according to claim 1, wherein the unit of stranded leads and filler strands of the sensor element are surrounded by a non-woven fabric of copper threads over which is arranged a polyethylene terephthalate foil.

4. Line according to claim 1, wherein the unit of stranded lines and filler strands of the sensor element is surrounded by a woven fabric of copper, wherein a polyethylene terephthalate foil is arranged over the copper fabric.

5. Line according to claim 1, wherein the inner casing is composed of an inner extruded rubber guide layer and a layer of electrically nonconductive insulation material arranged over the inner casing.

6. Line according to claim 1, wherein the inner casing is surrounded by a fabric serving as torsion protection.

7. Line according to claim 1, wherein the outer casing is composed of a material on the basis of chlorinated rubber.

* * * * *